March 20, 1928.
O. C. SNYDER
NUT LOCK
Filed Jan. 21, 1927
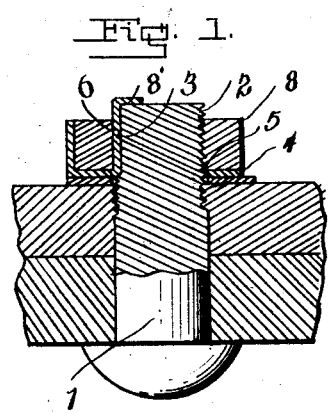
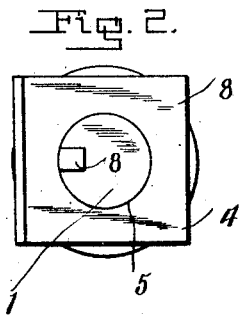
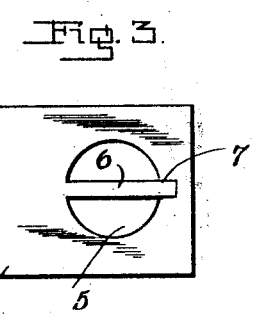
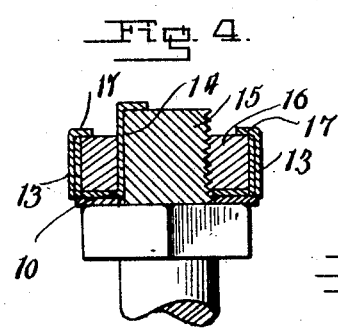
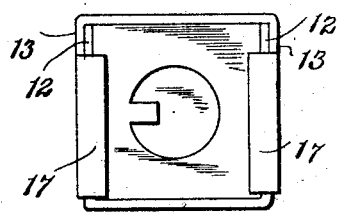
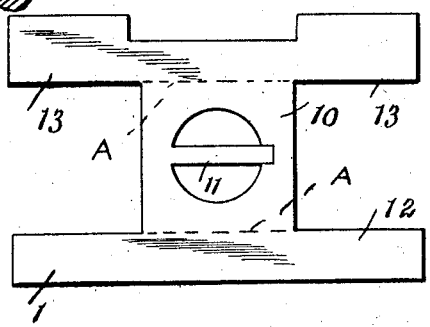
Inventor
O.C. Snyder.
By Lacey & Lacey, Attorneys Patented Mar. 20, 1928.

1,663,393

UNITED STATES PATENT OFFICE.

ORLOW C. SNYDER, OF LONG ISLAND CITY, NEW YORK.

NUT LOCK.

Application filed January 21, 1927. Serial No. 162,522.

The present invention is directed to improvements in nut locks.

The primary object of the invention is to provide a device of this character so constructed that when in its operative position will positively prevent the nut from becoming loose and accidentally disengaged from the bolt.

Another object of the invention is to provide a device of the character including a novel form of locking plate so constructed that it can be bent in order to firmly interlock the nut and bolt and hold the same against relative rotation.

In the drawing:

Figure 1 is a vertical sectional view through the device.

Figure 2 is a top plan view.

Figure 3 is a plan view of the blank from which the locking plate is formed.

Figure 4 is a side elevation, partly in section, of a modified form of the invention.

Figure 5 is a top plan view of the modified form of the invention.

Figure 6 is a top plan view of the locking plate.

Referring to the drawings, 1 designates a bolt, threaded as at 2, and provided with a longitudinal groove 3. A lock plate 4 is provided and is rectangular in shape, said plate being formed from suitable metal and is cut by a die in order to provide a bolt-receiving opening 5 and a tongue 6.

The die is so fashioned as to cut a tongue which is longer than the diameter of the opening in order to provide a relatively long tongue.

It will be observed upon reference to Figure 3 that the terminal of the tongue is formed by cutting a section of the plate from the inner periphery of the opening 6, as indicated at 7. After the blank forming the plate has been cut the tongue 6 is bent upwardly and when engaged with the bolt the tongue 6 will lie in the groove 3 thereof. The nut 8 is then threaded upon the bolt and the terminal of the tongue 6 is bent downwardly into contact with the end of the bolt, as at 8. After the nut 8 has been adjusted one end of the plate 4 is bent upwardly to provide an ear 5 which intimately engages one side of the nut. When the ear 9 is thus engaged and the tongue 6 occupies a groove 3 the nut and bolt will be firmly interlocked and held against relative rotation.

In the modified form of the invention, the locking plate 10 is provided with a tongue 11, the corners of the plate being provided with diametrically opposed ears 12—12 and 13—13 shaped as shown in Figure 6 of the drawing.

The tongue 11 is engaged in the groove 14 of the bolt 15 and the ends of the plate bent upon the line A for contact with the adjacent faces of the nut 16. The ears 12 are then bent into engagement with the angularly disposed faces of the nut, after which the ears 13 are bent to overlap the ears 12, the upper edges of the ears 13 then being bent inwardly to provide lips 17, which rest upon the upper face of the nut, as clearly shown in Figures 4 and 5.

Having thus described the invention, I claim:

In a nut lock, the combination with a nut and bolt, the bolt having a groove therein, a lock plate having a tongue for engagement with the groove, said lock plate having ears adapted to be bent into overlapped relation for engagement with the sides of the nut, certain of said ears having lips for engagement with the upper edges of the inner ears and with the upper surface of the nut.

In testimony whereof I affix my signature.

ORLOW C. SNYDER. [L. S.]